(12) United States Patent  
Aschenbrenner et al.

(10) Patent No.: US 6,850,338 B1  
(45) Date of Patent: Feb. 1, 2005

(54) METHOD, SYSTEM, PROGRAM, AND DATA STRUCTURE FOR GENERATING RASTER OBJECTS

(75) Inventors: Jean Margaret Aschenbrenner, Boulder, CO (US); Christopher Starbuck Kush, Longmont, CO (US); John Thomas Varga, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/569,777

(22) Filed: May 12, 2000

(51) Int. Cl.$^7$ .......................... H04N 1/403; G06K 15/00
(52) U.S. Cl. ...................... 358/1.15; 358/2.1; 358/2.99; 358/3.01
(58) Field of Search ................ 358/1.1–1.9, 1.11–1.18, 358/2.1, 2.99, 3.21, 3.24, 501, 515; 382/173–180; 345/418–428; 715/530, 531; 712/28

(56) References Cited

U.S. PATENT DOCUMENTS

| | | | |
|---|---|---|---|
| 3,961,750 A | 6/1976 | Dao | |
| 4,125,873 A | 11/1978 | Chesarek | |
| 4,484,187 A | 11/1984 | Brown et al. | |

(List continued on next page.)

FOREIGN PATENT DOCUMENTS

| | | |
|---|---|---|
| EP | 0886205 | 12/1998 |
| EP | 0886208 | 12/1998 |
| EP | 0886235 | 12/1998 |
| EP | 0886435 | 12/1998 |
| JP | 421077 | 4/1992 |
| JP | 10-191043 | 7/1998 |
| JP | 11-32207 | 2/1999 |

OTHER PUBLICATIONS

U.S. Appl. No. 09/570,211, filed May 12, 2000, entitled Method, System, and Logic for Selecting Line Work and Control Data for a Pixel from Multiple Objects of Line Work Data Provided for the Pixel.

*Primary Examiner*—King Y. Poon
(74) *Attorney, Agent, or Firm*—David W. Victor; Konrad Raynes & Victor LLP

(57) ABSTRACT

Disclosed is a method, system, program, and data structure for generating raster objects. A plurality of input contone and line work objects are received containing contone or line work data for at least one pixel on a sheet. For each input contone object, at least one output contone object is generated including color data for each pixel in the input contone object. For each input line work object, at least one output line work object is generated including color data for each pixel in the input print data object. Control data is generated for each pixel indicating whether to select data from the output line work object or output contone object for the pixel, wherein the control data is used by logic to select color data from the output line work object or output contone object for pixel data to send to an output device to render the pixel data.

44 Claims, 7 Drawing Sheets

U.S. PATENT DOCUMENTS

| | | | |
|---|---|---|---|
| 4,570,233 A | | 2/1986 | Yan et al. |
| 4,642,676 A | | 2/1987 | Weinger |
| 4,675,666 A | | 6/1987 | Peterson |
| 4,700,181 A | | 10/1987 | Maine et al. |
| 4,918,626 A | * | 4/1990 | Watkins et al. ............. 345/421 |
| 4,924,414 A | | 5/1990 | Ueda |
| 4,951,229 A | | 8/1990 | DiNicola et al. |
| 5,058,040 A | | 10/1991 | Tajima |
| 5,359,432 A | | 10/1994 | Peltzer et al. |
| 5,454,071 A | * | 9/1995 | Siverbrook et al. ......... 345/441 |
| 5,477,543 A | | 12/1995 | Purcell |
| 5,602,976 A | * | 2/1997 | Cooper et al. ............. 358/1.15 |
| 5,621,869 A | | 4/1997 | Drews |
| 5,732,248 A | | 3/1998 | Prouty et al. |
| 5,751,291 A | | 5/1998 | Olsen et al. |
| 5,754,180 A | | 5/1998 | Kivolowitz et al. |
| 5,760,780 A | | 6/1998 | Larson et al. |
| 5,781,197 A | | 7/1998 | Saunders |
| 5,835,095 A | | 11/1998 | Smith et al. |
| 5,844,828 A | | 12/1998 | Fujimura et al. |
| 5,852,711 A | | 12/1998 | Campbell |
| 5,852,742 A | | 12/1998 | Vondran, Jr. et al. |
| 5,857,035 A | | 1/1999 | Rust |
| 5,948,050 A | | 9/1999 | Diamondstein et al. |
| 5,949,909 A | | 9/1999 | Kao et al. |
| 5,960,115 A | | 9/1999 | Kao et al. |
| 6,006,244 A | | 12/1999 | Mahurin |
| 6,049,390 A | * | 4/2000 | Notredame et al. ........ 358/1.15 |

* cited by examiner

METHOD, SYSTEM, PROGRAM, AND DATA STRUCTURE FOR GENERATING RASTER OBJECTS

CROSS-REFERENCE TO RELATED APPLICATION

This application is related to the copending and commonly assigned patent application entitled "Method, System, and Logic For Selecting Line Work And Control Data For a Pixel From Multiple Objects Of Line Work Data Provided For The Pixel", to David E. Finlay and Phillip K. Hoskins, having Application Ser. No. 09/570,211, which is incorporated herein by reference in its entirety.

BACKGROUND OF THE INVENTION

1. Field of the Invention

The present invention relates to a method, system, program, and data structures for generating raster objects that are used in further processing to generate the output raster data used to control a device to generate output.

2. Description of the Related Art

To print an image, a print engine processor, referred to herein as a raster image processor, converts the image in a page description language or vector graphics format to a bit mapped image indicating a value to print at each pixel of the image. The bit mapped image is sent to the printer to cause the print heads to print the specified color value at the pixel according to the information in the bit map. If a printer has multiple print heads, such as a print head for different colors, then bit maps are generated for each print head. The print heads overlay the images defined by their respective bit maps onto the print medium.

To produce the bit maps for the print heads, the raster image processor performs numerous transformations on a print image, which may include different types of data, such as line art, e.g., text and graphics, and continuous tone ("contone"), e.g., images. The raster image processor usually performs operations such as data compression, color space conversion, and halftoning when generating the raster bit map to print. After dissecting a print image into different components, such as color components, text art, contone, images, etc., the raster image processor must then merge the different elements together so that the original image, previously split into different components, is reconstructed for the color plane process.

As newer printers print at ever higher resolutions and speeds, the amount of data needed to generate the print job correspondingly increases. One of the major challenges in increasing printer speed and improving performance is optimizing the time required to rasterize print data, especially the time required by the raster image processor to break an image into different object components and then reassemble, decompress, screen and merge those components into a final bitmap image.

Thus, there is a need in the art to provide an improved method, system, and program to transform print data, such as text, vector graphics, images and raster data into final rasterized bit maps in a more timely manner to increase printer throughput

SUMMARY OF THE PREFERRED EMBODIMENTS

To overcome the limitations in the prior art described above, preferred embodiments disclose a method, system, program, and data structures for generating raster objects. A plurality of input contone and line work objects are received containing contone or line work data for at least one pixel on a sheet. For each input contone object, at least one output contone object is generated including color data for each pixel in the input contone object. For each input line work object, at least one output line work object is generated including color data for each pixel in the input print data object. Control data is generated for each pixel indicating whether to select data from the output line work object or output contone object for the pixel, wherein the control data is used by logic to select color data from the output line work object or output contone object for pixel data to send to an output device to render the pixel data.

In further embodiments, one intermediary line work object including color data for each pixel in the input line work object is generated for each input line work object. The output line work object is generated from one intermediary line work object. One intermediary contone object including color data for each pixel in the input contone object is generated for each input contone object. The output contone object is generated from one intermediary contone object. A determination is made as to whether there are more than a maximum number of intermediary line work objects that intersect one scan line. If so, multiple intermediary line work objects are merged into one merged output line work object if there are more than the maximum number of intermediary line work objects intersecting the scan line. One output line work object is generated for the merged intermediary line work object such that the generated output line work objects that intersect a scan line are less than the maximum number.

Preferred embodiments provide an algorithm and data structures for a raster image processor to use to generate a set of raster objects from independent displayable objects (IDOs) that may be further processed by another logic component, such as a processor or hardware card. These set of raster objects generated by the raster image processor include color data from line work or contone objects and control bits indicating which raster object to use to select the color data for a pixel. In this way many of the merging, screening and decompression operations are offloaded to an external hardware card or processor thereby relieving the raster image processor of substantial processing burdens. This relief provided to the raster image processor improves the performance of the raster generation process and ultimately improves print speed by allowing final output raster data to be fed at a faster rate to the printer.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
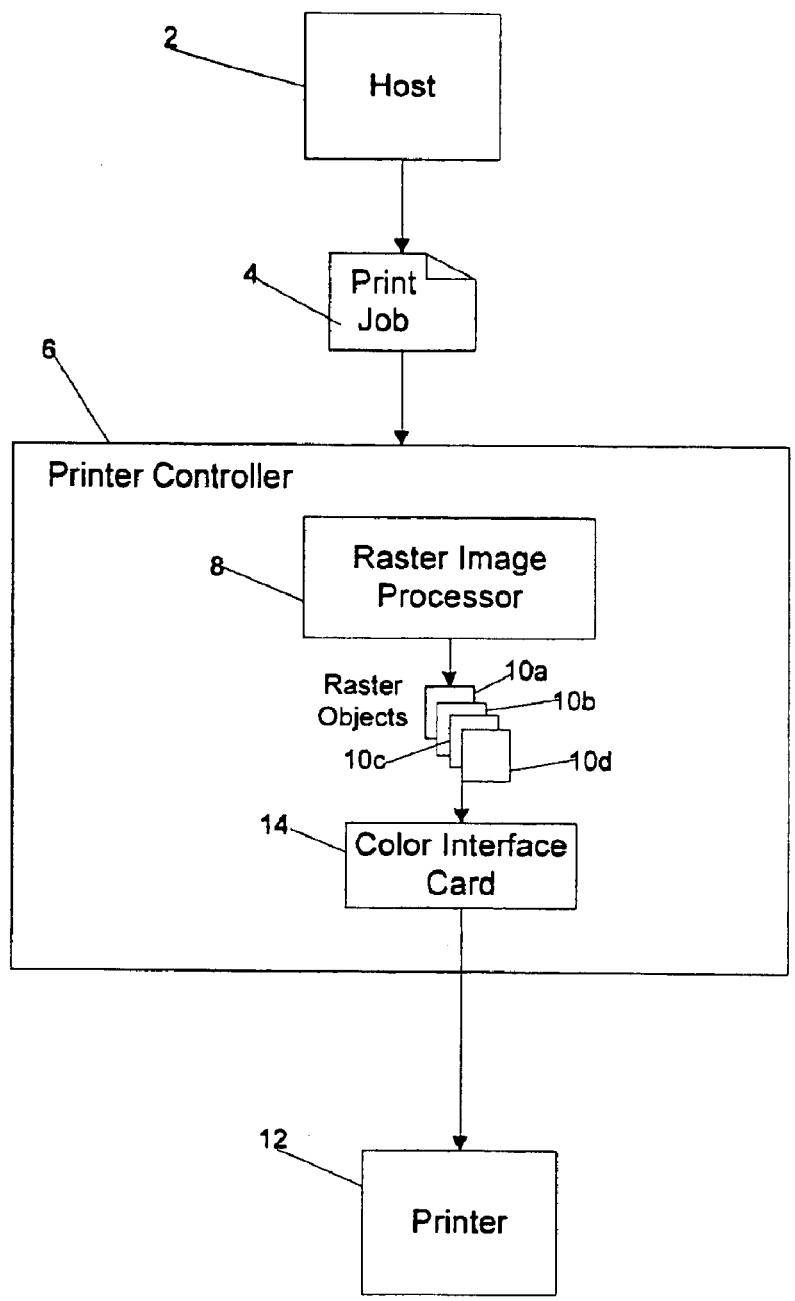
FIG. 1 illustrates a printing environment in which preferred embodiments of the present invention are implemented.

FIG. 1 illustrates a printing environment in which preferred embodiments are implemented. A host computer 2 generates a print job 4 that may include image (contone) and line work (text) components. The host 2 transmits the print job 4 to a printer controller 6 over a cable or network transmission line. The printer controller 6 may comprise a standalone processor or computer, such as the IBM RS/6000 processor. The printer controller 6 includes a raster image processor 8, that is preferably implemented in the RS/6000 main processor and accompanying firmware. In preferred embodiments, the raster image processor 8 generates raster objects 10a, b, c, d including the raster data. Each raster object 10a, b, c, d includes pixel information for one color component of the imaging system 12. For instance, if the imaging system 12 prints Cyan (C), Magenta (M), Yellow (Y) and black (K), then there would be one raster object for each color component for a scan line to print. Further, there may be separate raster objects 10a, b, c, d for line art and contone (images), thus providing 8 separate raster objects for each color component of a scan line for the line art and contone components of the line. The printer controller 6 and imaging system 12 components may be implemented in the same large scale printer, such as the International Business Machines (IBM) Corporation's Infoprint color printers, or with a separate server and standalone printer communicating over a network or attached directly using a serial or parallel port.

**RS/6000 and Infoprint are registered trademarks of International Business Machines Corporation.

Preferred embodiments include a color interface card (CIC) 14 that is preferably implemented on a hardware card, such as a PCI card using Field Programmable Gate Array (FPGA) logic. The CIC card 14 may be inserted in a PCI slot of the backplane of the printer controller 6. The CIC card 14 performs further processing of the raster objects 10 before they are sent to the imaging system 12 for printing.

In certain implementations, one CIC card 14 is capable of producing print data for two of the color planes. In such case, two CIC cards are needed to generate the final raster for the output device for all four color planes. In duplex implementations where the printer prints on both sides of a sheet concurrently, four CIC cards would be used, two for each side of the sheet to concurrently generate raster data for the print heads printing to both sides.

Generating Raster Objects to be Used by the CIC Card

Preferred embodiments provide an algorithm and data structure for the raster image processor 8 to use to generate separate line work and contone objects that are sent to the CIC card 14 to combine and produce the final print output. The raster image processor 8 encodes the line work and contone objects with header information that enables the CIC card 14 logic to combine multiple line work and contone objects per scan line into final print output. In this way, many of the raster processing operations can be offloaded to a separate hardware card, thereby relieving the raster image processor 8 of many of the processor intensive raster operations. This in turn substantially increase the ultimate printer speed and performance because the final raster output data used by the printer (or other output device) is generated faster by offloading many of the raster processing operations to dedicated hardware logic implemented in the CIC card 14.

In described implementations, the CIC card 14 includes hardware logic to handle up to four line work and four contone objects per scan line per color, totaling 16 line work and 16 contone objects per scan line. For this reason, if the raster image processor 8 receives input print data objects including more than four contone or line work objects per scan line, then the raster image processor 8 must merge certain objects to conform to the CIC card 14 hardware limitations. If the CIC card 14 was capable of handling more or less line work or contone objects per scan line, i.e., n objects, then the raster image processor 8 would have to merge input print data objects to ensure that there are no more than n line work or n contone objects per scan line.

Figure 2:
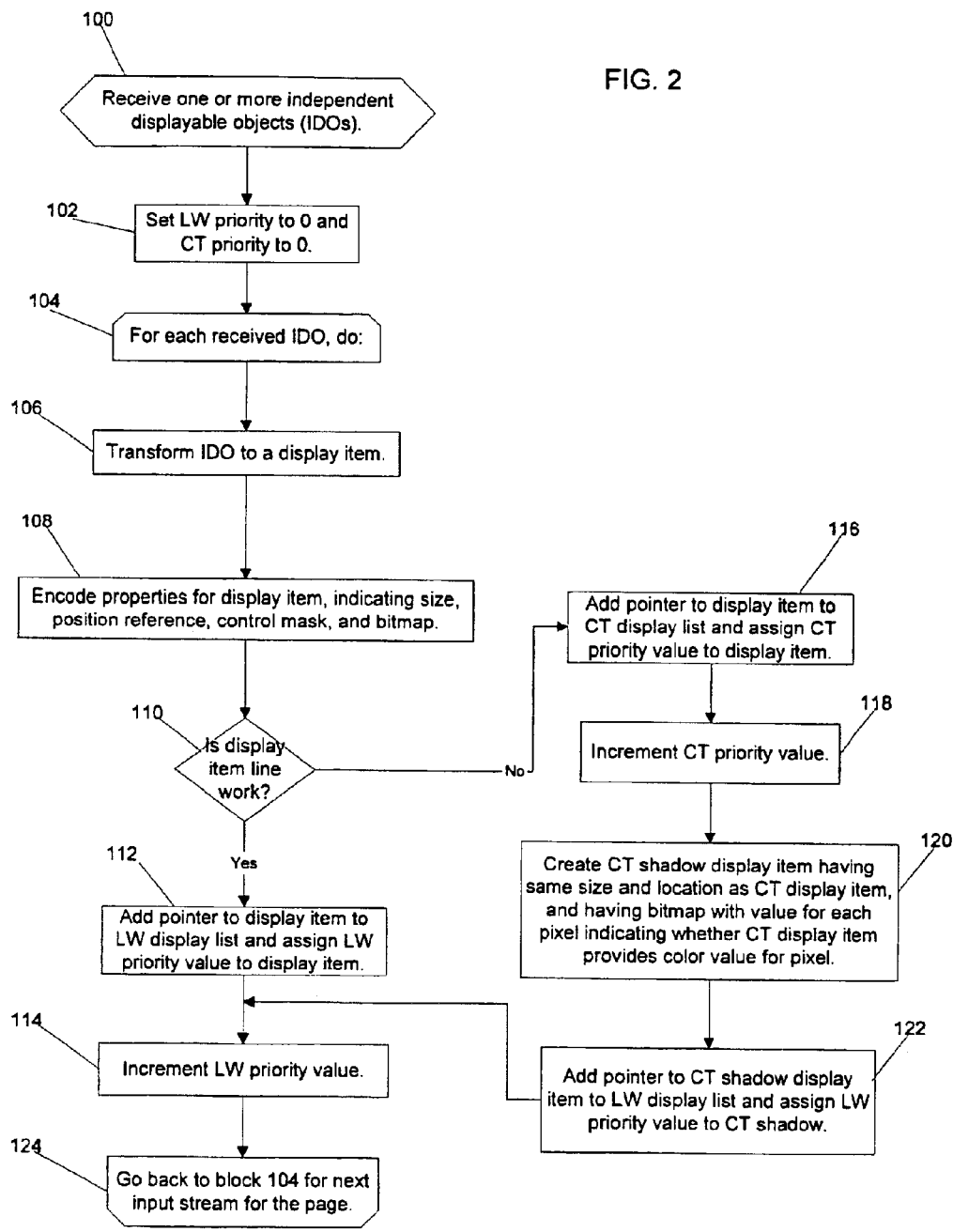
FIGS. 2, 5a, 5b, and 6 illustrate logic to generate line work and raster objects in accordance with preferred embodiments of the present invention.
Figure 5A:
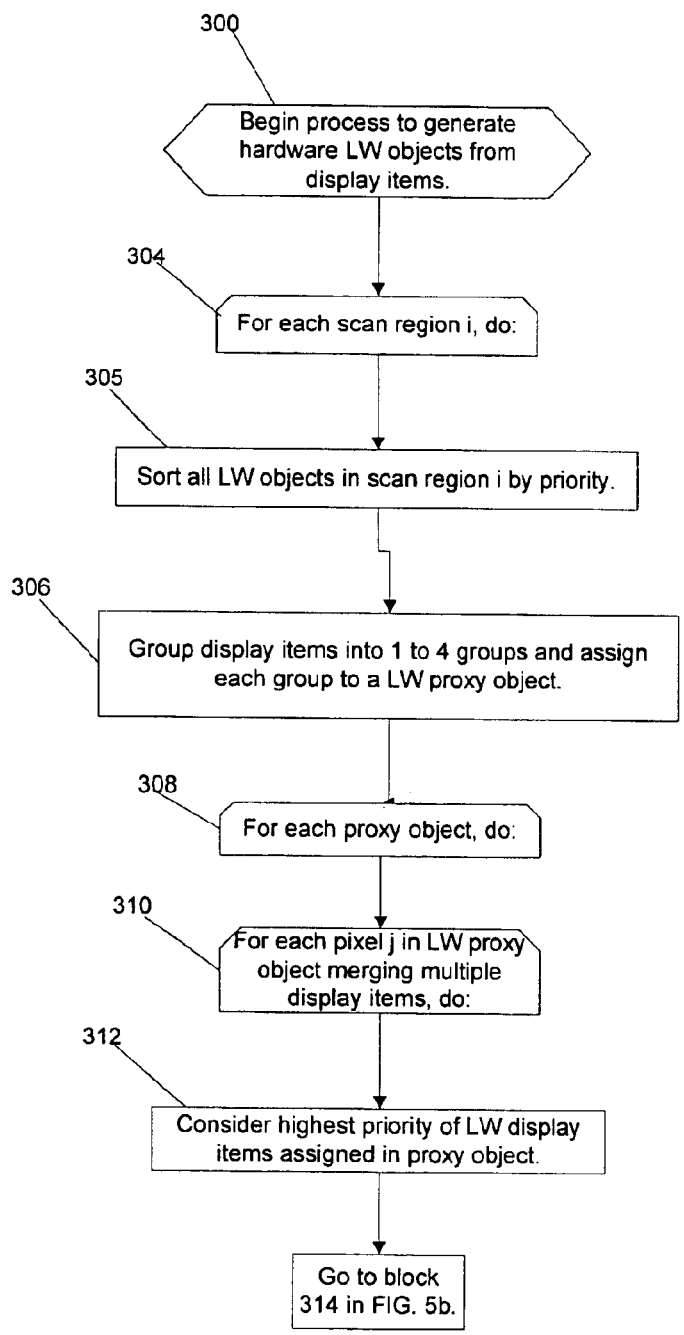
Figure 5B:
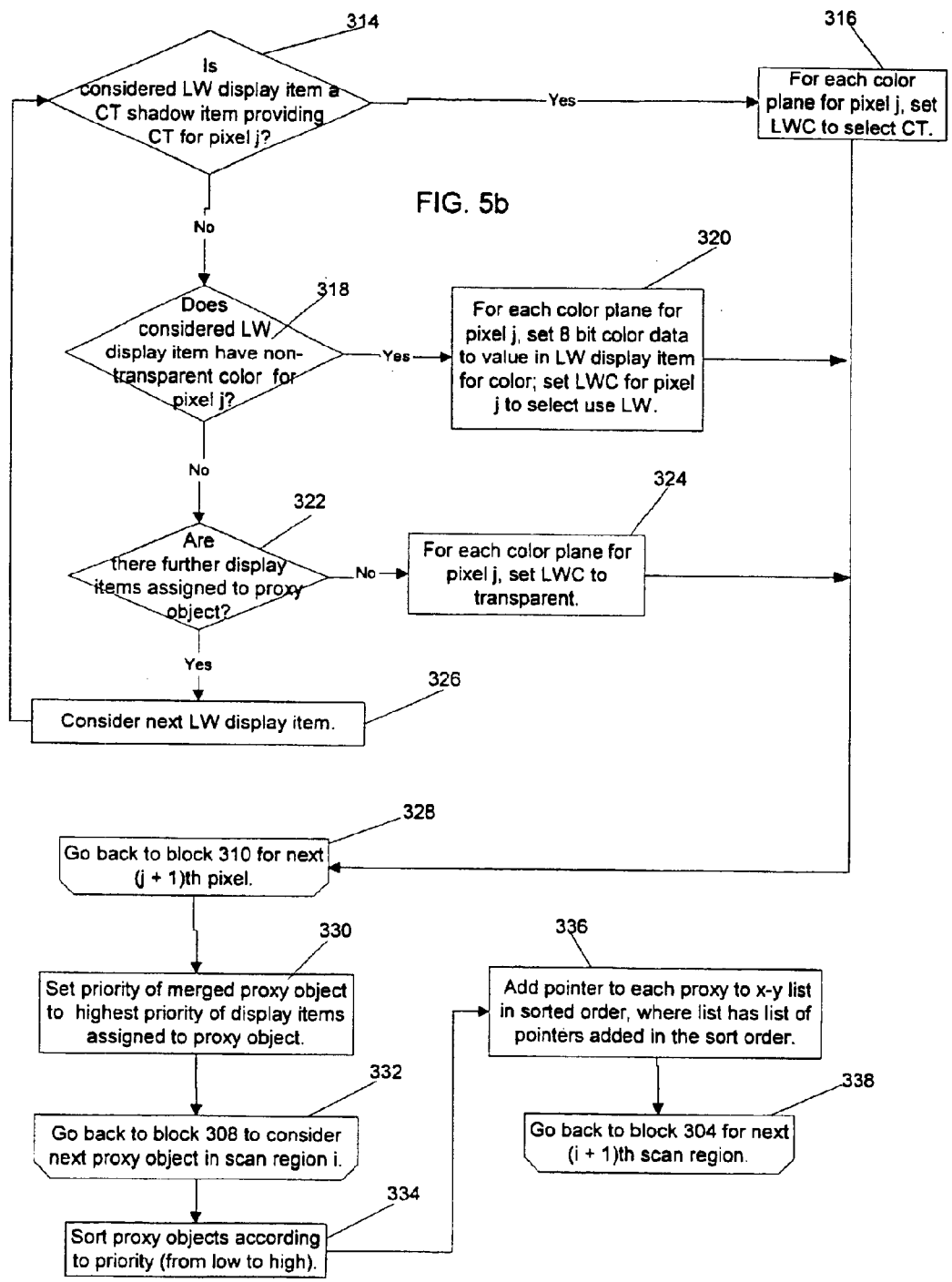

FIGS. 2, 5a, b, and 6 illustrate logic executed by the raster image processor 8 to generate raster objects 10a, b, c, d that may later be used by the CIC card 14 in accordance with the preferred embodiments. FIG. 2 illustrates logic executed by the raster image processor 8 to transform input independent displayable objects (IDOs), comprising text, bi-level, vector graphics, page description commands or any other data format that may be generated by an application program, into an intermediary object referred to as a display item that includes the print information from the input print data object. Print information may comprise a bitmap indicating color values for particular pixels in a sheet or page description language commands instructing the placement of color values at particular locations on the sheet. Control begins at block 100 with the raster image processor 8 receiving one or more independent displayable objects (IDOs). The IDOs may comprise text, images, graphics, compressed images, non-compressed images, rectangles, bar codes, page description language commands, etc. The raster image processor 8 sets (at block 102) a line work (LW) and contone (CT) priority variables to zero. For each received IDO (at block 104), the raster image processor 8 generates (at block 106) a display item.

A display item includes a bit map of data indicating what to display for pixels on one or more scan lines. The raster image processor 8 would further generate (at block 108) a set of properties for each line work and contone display item, indicating the display item size, position information for the color data on the sheet, and a control mask. The control mask indicates whether color data for a particular pixel in the display item should be displayed (is non-transparent) or not displayed (is transparent). Display item types include solid rectangles, bilevel bitmaps, JPEG (Joint Photographics Expert Group) images, etc.

A solid rectangle display item would include CMYK color data, height and width data and position data on the sheet for the solid shape.

Figure 3:
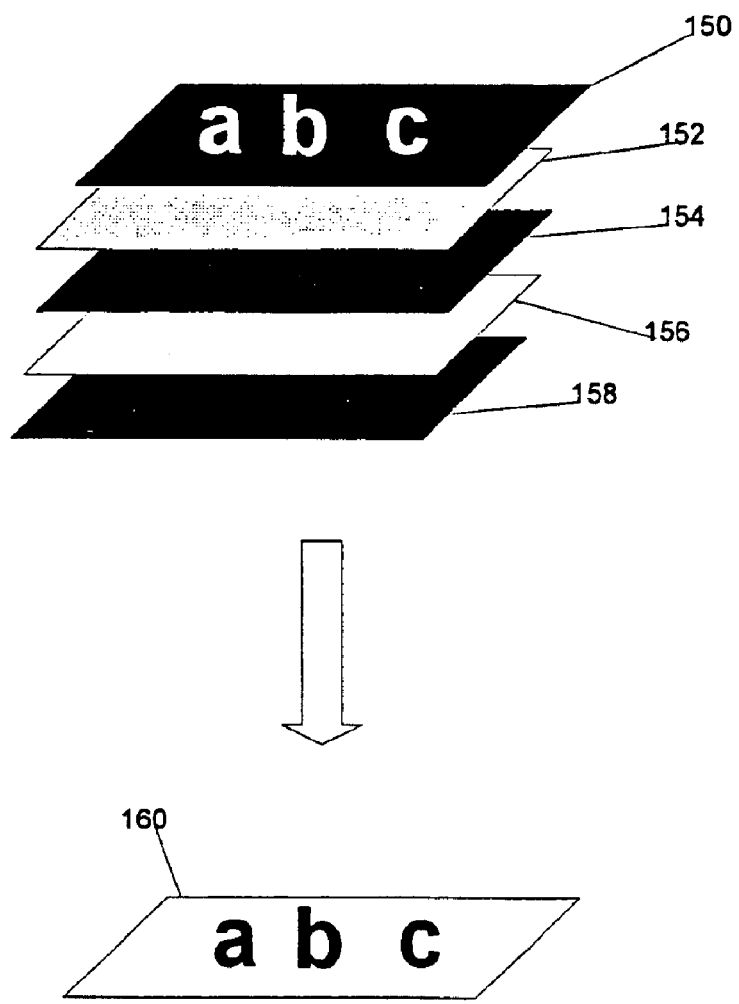
FIG. 3 illustrates an example of the component objects of a bi-level display item in accordance with preferred embodiments of the present invention.

A bilevel display item is generated for independent displayable objects (IDO) comprising text, bilevel images or bar code that has only a single color. The bilevel display item includes four one byte color objects for the four color planes CMYK and a line work mask. The combination of the colors for each of the four color planes specified in the CMYK color objects together define the color of the bi-level display item. The line work mask comprises a bit value for each pixel of the bi-level image area. An "on" value indicates that the bi-level image provides color for that pixel corresponding to the "on" value (non-transparent data). An "off" mask value indicates that the color data is not to be used for the pixel (transparent). FIG. 3 provides an example of the component objects of a bilevel display item for the text string "a b c". Line work objects 152, 154, 156, and 158 each provide a one byte color value for one of C, M, Y and K and a line work mask 150. The white part of the line work mask 150 represents the non-transparent pixels for which the color defined by the CMYK objects 152–158 is used and the black areas represent the transparent portions for which the color data is not used. Thus, the letters appear (at block 160) through the non-transparent pixels indicated in the control mask.

A JPEG display item is used to define a JPEG compressed continuous tone (contone) image. The JPEG display item would include a JPEG continuous tone compressed version of the 32-bit color values for the picture. In preferred embodiments, the amount of loss is controlled by the application (generator of the IDO inputted to the system).

The raster image processor 8 would produce different line work and contone display items for the different types of independent displayable objects received in an input data stream.

If the generated display item is for line work (at block 110) then the raster image processor 8 adds (at block 112) a pointer to the display item to a line work (LW) display list and assigns the current line work (LW) priority value to the display item entry in the display list. The line work (LW) priority value is incremented (at block 114). Otherwise, if the generated display item is a contone object, then the pointer to the display item is added (at block 116) to the contone (CT) display list and the contone (CT) priority value is assigned to the display item entry in the CT display list. The contone (CT) priority value is then incremented (at block 118). The raster image processor then creates (at block 120) a contone (CT) shadow display item having the same size and location as the contone (CT) display item, and having a bitmap including, for each pixel in the contone (CT) display item, a value indicating whether the contone (CT) display item provides a color value for the pixel. A pointer to the contone (CT) shadow display item is then added (at block 122) to the line work display list and the contone (CT) shadow display item is assigned the priority value of the line work priority variable. Control then transfers to block 114. In this way, the line work (LW) display list maintains information on all line work and contone objects that provide pixel data for a sheet and the relative priority of the provided pixel data. This contone (CT) shadow object is used when determining the value to set for the line work control (LWC) bits in the line work object, i.e., whether the data for the pixel should come from one contone object or line work object.

This process from blocks 106 to 122 occurs for each independent display object (IDO) received for a sheet (block 106 to block 124). The end result of the logic of FIG. 2 is line work and contone display lists having pointers to display items having a priority value indicating the order in which the independent display objects were received. In preferred embodiments, the raster image processor 8 receives independent display objects (IDOs) according to the priority in which they are to be displayed, such that a later received IDO has priority over any overlapping portions with an earlier received IDO. Thus, the contone (CT) and line work (LW) priority values assigned to the display items in the display lists indicate the priority in which the print data for the contone and line work display items are to be displayed with respect to other contone and line work display items. Further, the line work (LW) display list further indicates (through the use of the contone (CT) shadow display items) whether contone display items also provide data, and a priority of such contone data provided by the contone (CT) display item.

As discussed, in preferred implementations, the CIC card 14 hardware logic can only handle at most four contone and four line work objects per scan line for each color plane (CMYK). FIGS. 5a, b illustrate logic executed by the raster image processor 8 to merge contone and line work display item data in a manner that ensures that the number of objects intersecting a scan line does not exceed the maximum that may be handled by the CIC card 14 hardware logic. Further, the logic of FIGS. 5a, b provides logic for encoding each pixel represented in the line work object with two line work control (LWC) bits indicating select line work, select contone or transparent. A select line work value instructs the CIC card 14 logic to use the data provided in the current line work object for the pixel. A select contone instructs the CIC card logic 14 to use the data indicated in the highest priority contone object for the pixel. A transparent value indicates to consider the next highest priority line work object for the pixel.

In preferred embodiments, as part of the merge process, separate line work and contone scan regions are defined for the contone and line work display items in the respective display lists. A scan region defines one or more scan lines that encompasses one or more objects. Scan regions are created by processing each scan line. Every time a new object boundary, start or end, appears on a scan line, then the current scan region is divided into two scan regions—the scan region before the scan line and the one following. The initial scan region begins at the first scan line on a sheet. When the boundary of the first object or a new object is reached, then this initial scan region is divided into one region prior to the boundary and a second region following the boundary, which may then be subdivided further as further start and end boundaries are reached. After defining the scan regions for the contone and line work display lists, the raster image processor 8 would then include with each defined scan region a list of pointers to the display items that intersect that scan region.

Figure 4:
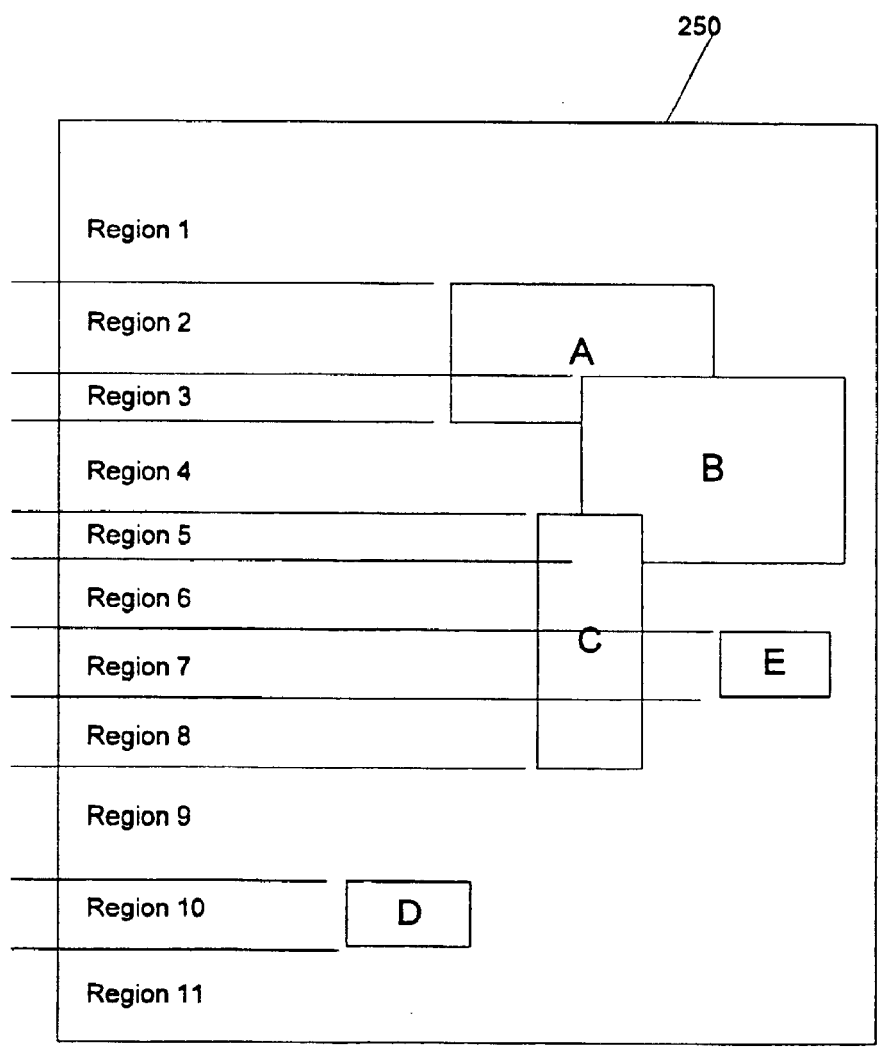
FIG. 4 illustrates how screen regions are defined for a sheet including multiple line work or contone display items in accordance with preferred embodiments of the present invention.

FIG. 4 illustrates a sheet 250 including (line work or contone) objects A, B, C, D, and E. The objects are represented on the sheet 250 according to the X, Y coordinate position. Each scan region is defined as having a start scan line and an end scan line. The start and end scan lines are positioned where a display item starts or where a display item ends. In one embodiment, the start and end of a scan region are limited to a fixed set of positions within the sheet such that a scan region contains a minimum number of scan lines. New regions are only created when the start or end of an item falls further outside the minimum scan region boundaries. In this way, each scan region is assured to include a minimum number of scan lines in order to reduce the number of scan regions, and hence, objects created. Each object requires processor overhead to generate the header information and to separately process in the CIC card 14. Thus, performance is improved to the extent the scan line size of a scan region and raster object is increased. This scan region minimum line requirement avoids producing very small scan regions, which degrades performance.

FIGS. 5a, b illustrate logic implemented in the raster image processor 8 to create the raster objects 10a, b, c, d for each color plane. As discussed, if there are more than four contone (CT) or four line work (LW) display items that overlap a scan line, then the print data for the parts of multiple display items within the same range must be merged into the line work or contone raster object. Further, during the merge process, the raster image processor uses the mask data and other generated data to set two line work control (LWC) bits in the output line work raster object 10a, b, c, d instructing the CIC card 14 whether to use the current line work raster object, use the highest priority contone object or consider the line work object having the next highest priority for a particular pixel.

With respect to FIG. 5a, the process to generate the final contone and line work raster objects 10a, b, c, d used by the CIC card 14 begins at block 300 after generating all the contone and line work scan regions. At blocks 304 to 338, the raster image processor 8 performs a loop of operations 306 to 336 for each scan region i on the sheet to generate the color data and line work control (LWC) bits for the line work object and the color data for the contone objects. The result is a separate line work and contone object for each of the color planes CMYK.

At block 305, the raster image processor 8 sorts all the line work (LW) objects in a scan region i by their priority (assigned at block 112 in FIG. 2). The raster image processor 8 then groups (at block 306) the display items into one to four groups. In preferred embodiments, each group would have display items of contiguous priority as determined by the sort. However, in alternative embodiments, display items may be assigned into groups based on factors other than contiguous priority, such as the relatedness of the type of data in the display item, e.g., group all display items having data in a certain compression format, certain color data format, etc. Further, it is possible that display items having non-contiguous priority could be assigned to the same group. Each group is then assigned to one of the proxy objects created for a scan region in the raster image processor 8 memory. In current implementations, there may be at most four proxy objects for a scan region. Each proxy object would include pixel information for each pixel in scan region i. A line work proxy object is a placeholder into which eight bits of color data for one color plane and two bits of line work control (LWC) are encoded for each pixel in scan region i. The proxy object is created as part of the process of generating the final line work raster objects 10a, b, c, d capable of being processed by the CIC card 14.

From blocks 308 to 332, the raster image processor 8 performs a loop for each proxy object in the scan region i. For each proxy object and for each pixel j in the line work proxy object, the raster image processor performs blocks 310 to 328. At block 312 the raster image processor 8 considers the line work (LW) display item in the proxy object that has the highest priority. If (at block 314), the considered LW display item is a contone shadow display item indicating contone (CT) data for pixel j, then that contone color value in the contone display item represented by the contone (CT) shadow object should ultimately be selected for the final print output selected by the CIC card 14. For this reason, the raster image processor sets (at block 316) the line work control (LWC) bits to select contone (CT), to cause the CIC card 14 to later select the highest priority non-transparent contone color value for each pixel j in each color plane.

If (at block 314) the considered (LW) display item is not a contone (CT) shadow item, then the raster image processor determines (at block 318) whether the line work display item being considered has a non-transparent color value for pixel j. This can be determined from the control mask which has an "on" value for a pixel when there is non-transparent data and an "off" value when the color data provided is transparent, not to be used. If the line work (LW) display item provides non-transparent pixel data, then for each color plane for pixel j, the raster image processor 8 sets (at block 320) the eight bit color data for the color plane to the value in the line work display item for pixel j in the color plane (CMYK) and sets the two line work control (LWC) bits to use line work (LW), instructing the CIC card 14 to use the line work data for pixel j.

If (at block 318), the considered line work (LW) display item control mask indicates transparent for pixel j, then the raster image processor 8 determines (at block 322) whether are further display items assigned to the proxy object not yet considered. If not, then the raster image processor 8 sets (at block 324) the line work control (LWC) bits for each color plane for pixel j to transparent. Otherwise, if (at block 322) there are further display items not yet considered for the proxy object, then the raster image processor 8 considers (at block 326) the next highest priority display item (which can be either a line work or a contone shadow item) and returns to block 314 to use the line work control (LWC) display item being considered to determine data for pixel j in the proxy object for each color plane. After setting the value for pixel j for each color plane of the merged proxy objects at blocks 316, 320 or 324, control proceeds to block 328 to continue the loop for the next (j+1)th pixel. After encoding color data and line work control (LWC) bits for all the pixel data in the current proxy objects for each color plane, the priority of the merged proxy object is set (at block 330) to the highest priority of the display items assigned to the proxy object. At block 332, control then returns to block 308 to consider the next proxy object, and all line work display items assigned thereto, in the scan region i.

As part of forming the proxy objects for a sheet, the raster image processor 8 further maintains an X-Y list comprising a linked list of pointers to proxy objects in the order in which they provide pixel data for the sheet. To form the X-Y list, after processing all proxy objects in the scan region i, the raster image processor 8 sorts (at block 334) the proxy objects for the scan region according to their priority, from low to high. A pointer is then added (at block 336) in the X-Y list to each proxy object in the scan region according to the sort order. The entries or pointers in the X-Y list are linked such that each entry in the list has a pointer to a proxy object and a pointer to the proxy object added subsequently in the list. Control then returns to block 304 to consider the next (i+1)th scan region.

The execution of the logic in FIGS. 5a, b results in line work proxy objects including eight bits of color data and two line work control bits instructing the processor to use the color data from the proxy object (LW select), use the highest priority contone object (CT select) or consider the next line work proxy object (transparent).

If there are more than four contone display items for a scan region, then the raster image processor 8 will have to merge contone (CT) display items in contone (CT) to reduce the number of contone (CT) display items to four. This merging process would have to consider whether the pixels in the highest priority contone (CT) display item are transparent and whether data from a lower priority contone (CT) display item should be used in the merged contone (CT) proxy object. However, in preferred embodiments, there are no control bits in the contone objects, such as the line work control (LWC) bits, as decisions on whether to use contone or line work data are made with the line work control (LWC) bits in the line work raster object 10a, b, c, d.

Figure 6:
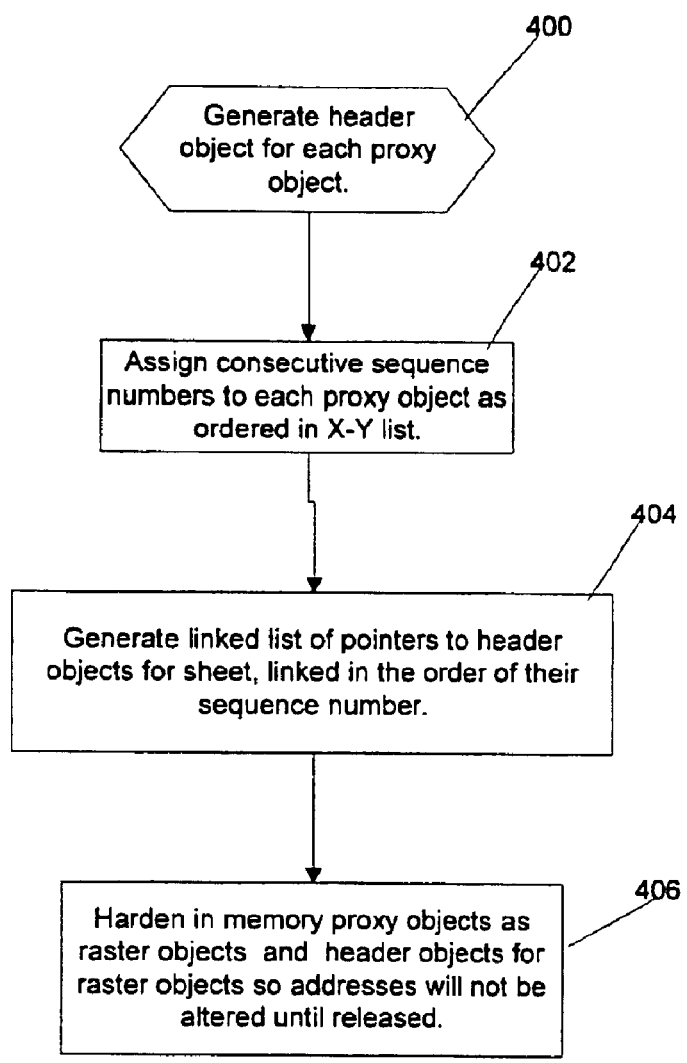

After generating the color data for the line work (LW) and contone (CT) proxy objects, the raster image processor 8 would then execute the logic of FIG. 6, beginning at block 400, to generate header information for the proxy object. Below are the fields in the header object the raster image processor 8 would generate for each color plane (CMYK) of each proxy object. At this point in time, the line work (LW) and contone (CT) proxy objects become raster objects 10a, b, c, d that the CIC card 14 would access.

Sequence Number: The raster objects for each color may then be numbered consecutively starting from zero for the raster (proxy) object at the top of the sheet. This new number is the sequence number. The sequence number is reset to zero for each color for the first object on the next sheet. Thus, raster objects are to be printed on a sheet according to the ordering of their sequence numbers. In preferred implementations, the maximum sequence number is fifteen. After reaching fifteen, the sequence number starts over at zero. The sequence number is used to determine whether raster objects are received in the correct order.

Object Type: Indicates whether an object is the first raster object on a sheet, a last object or a next object, which is any object between the first and last raster object The object type would also indicate whether the object is the last raster object for the entire print job and whether a blank page is to be printed. In preferred embodiments, the object type is represented by a five bit code, where the first bit indicates that the raster object is the first object on the sheet; the second bit indicates that the raster object is a next object, i.e., following the first object on the sheet; the third bit indicates that the raster object is the last object on a sheet; the fourth bit indicates whether the raster object is the last raster object for the print job; and the fifth bit indicates to print the entire current sheet blank, such as if one of the colors will not appear on the sheet or there are no line work or contone objects for the sheet. To print a blank sheet, a null contone (CT) and line work (LW) object indicating to print a blank sheet would have to be generated for each color plane. The copending and commonly assigned patent application entitled "Method, System, and Program for Error Checking Raster Objects," having U.S. Ser. No. 09/499,722, filed on Feb. 8, 2000, which application is incorporated herein by reference in its entirety, describes how the object type information is used to check the order in which the objects are received.

Compression type: information on the compression algorithm used to compress the raster object.

Priority level: indicates the priority for objects overlapping the same scan line. Objects with a higher priority are printed preferentially in place of other objects on a per pel basis. Thus, objects for a pel of a higher priority will appear over objects for a pel of a lower priority unless the high priority object is transparent to allow the lower priority object for the pel to appear through the higher priority object. Thus, the priority level indicates the order in which objects overlapping on a scan line are overlaid. The priority numbers are chosen to correspond to priorities of the four objects that overlap the same set of one or more scan lines.

Start and Stop Transport Addresses: Indicates the first and last coordinates the raster object occupies on the sheet in the transport direction.

Start and Stop Scan Addresses: Indicates the first and last coordinates the raster object occupies on the sheet in the scan direction. Start and Stop Clip in Transport Direction: Indicates the start and stop in the transport direction of where to clip image. For instance, if the start transport address is less than the start clip address, then the image will be clipped, not printed, for those pixels prior to the start clip address. If the end transport address is greater than the end clip transport address, then the image will also be clipped.

Start and Stop Clip in Scan Direction: Indicates the start and stop in the scan direction of where to clip image.

Link Address: A pointer to the line work or contone data represented by the header. The link address for line work header would specify both the address of the line work data (eight bits) and the line work control (LWC) bits.

The raster image processor 8 further generates (at block 402) sequence numbers for each proxy object according to their order in the X-Y list, i.e., starting from zero at the top of the linked list and numbering consecutively to the bottom of the X-Y linked list. The raster image processor 8 then generates (at block 404) a linked list of pointers to the headers according to the sequence number of the corresponding raster object. The raster image processor 406 then hardens in memory the proxy objects as raster objects and the header objects thereof so that the raster object and header addresses will not be overwritten or altered in memory by the operating system before they are accessed and then released by the CIC card 14. In this way, all the raster object data is maintained in a high speed memory which provides fast access for the CIC card 14 when requesting the data to process. This memory arrangement further improves performance by allowing the CIC card 14 to immediately retrieve raster and header objects from a high speed, volatile memory.

The CIC card 14 hardware may then use the generated raster objects 10a, b, c, d in memory to generate final raster output for an output device, such as a printer, as described in the related and copending patent applications entitled, "Method, System, and Logic For Selecting Line Work And Control Data For a Pixel From Multiple Objects Of Line Work Data Provided For The Pixel", having Application Ser. No. 09/570,211, which application is incorporated by reference in its entirety above.

The preferred embodiments have the raster image processor 8 convert input independent displayable objects (IDOs) into display items and then into multiple raster objects which may then be provided to a hardware card, e.g., the CIC card 14, to further process to generate the final print output. In this way, a substantial amount of raster processing operations that the prior art would implement in the raster image processor are handled, in the preferred embodiments, by hardware logic (the CIC card 14).

Preferred embodiments substantially improve the performance of the raster image processor 8 in generating raster data because in the preferred embodiments the raster image processor 8 only performs those raster steps needed to generate separate line work and contone objects that are further processed, i.e., decompressed, merged and screened, by hardware logic, thus offloading many of the highly processor intensive operations to dedicated hardware logic which can often perform such operations faster than the software or program of the raster image processor 8. Further by having two processors perform raster operations performed in the prior art by a single raster image processor, performance is substantially improved. Thus, preferred embodiments provide an improved way for allocating particular raster operations to the raster image processor 8 and to another processing unit, such as the CIC card 14 in order to improve the speed and performance of raster image processing.

Alternative Embodiments and Conclusions

The following describes some alternative embodiments for accomplishing the present invention.

The preferred embodiments may be implemented as a method, apparatus or information bearing media using standard programming and/or engineering techniques to produce software, firmware, hardware, or any combination thereof. The programs defining the functions of the preferred embodiment can be delivered to a computer via a variety of information bearing media, which include, but are not limited to, computer-readable devices, carriers, or media, such as a magnetic storage media, "floppy disk," CD-ROM, a file server providing access to the programs via a network transmission line, wireless transmission media, signals propagating through space, radio waves, infrared signals, etc. Of course, those skilled in the art will recognize that many modifications may be made to this configuration without departing from the scope of the present invention. Such information bearing media, when carrying computer-readable instructions that direct the functions of the present invention, represent alternative embodiments of the present invention In preferred embodiments, the raster objects had specific information, such as the object type, sequence number, etc., used to determine whether objects were received in the correct order. In alternative embodiments, further or modified information may be included in the raster objects to ensure that raster objects are processed in the correct order. Further there maybe different or additional object types other than those discussed herein.

In preferred embodiments, the CIC card that processes the generated raster objects comprises hardware logic. In alternative embodiments, an additional processor may be used to perform the further processing of the raster objects generated in accordance with the preferred embodiments.

In preferred embodiments, the raster objects are generated for a printer to use to control printer operations. However, in alternative embodiments the raster objects may provide color data for another device, such as a computer graphics card or display engine, to use when generating output display data.

Further, the CIC card may be implemented in hardware other than a PCI card on the printer controller backplane. Still further, operations described as performed in the raster image processor may be moved to the CIC card or alternative raster logic.

The logic of FIGS. 2, 5a, b and 6 described raster operations as occurring in a particular order. However, in alternative embodiments the raster operations may be performed in a different order, and steps may be modified, added or removed. Still further, the raster operations may be executed sequentially or certain operations may be executed in parallel to improve performance.

In preferred embodiments, independent objects become display items. However, in alternative embodiments, items may be grouped in many ways to produce intermediate objects providing the same display presentation characteristics.

In summary, preferred embodiments disclose a method, system, program, and data structures for generating raster objects. A plurality of input contone and line work objects are received containing contone or line work data for at least one pixel on a sheet. For each input contone object, at least one output contone object is generated including color data for each pixel in the input contone object. For each input line work object, at least one output line work object is generated including color data for each pixel in the input print data object. Control data is generated for each pixel indicating whether to select data from the output line work object or output contone object for the pixel, wherein the control data is used by logic to select color data from the output line work object or output contone object for pixel data to send to an output device to render the pixel data.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for generating raster objects, comprising:

receiving a plurality of input contone and line work objects containing contone or line work data for at least one pixel on a sheet;

generating for each input contone object at least one output contone object including color data for each pixel in the input contone object;

generating for each input line work object at least one output line work object including color data for each pixel in the input line work object; and generating control data for each pixel, wherein the control data is encoded to indicate one of a selection of pixel data from the output line work object, a selection of pixel data from a highest priority output contone object, and a selection of transparency and wherein the control data is used by logic to select color data from the output line work object or output contone object for pixel data to send to an output device to render the pixel data.

2. The method of claim 1, further comprising generating for each input contone and line work objects one output contone and line work object for each color component of the color data, wherein the logic is implemented in hardware, wherein a first number of the generated at least one output line work object does not exceed a first predetermined number of line work objects per scan line capable of being processed by the logic, and wherein a second number of the generated at least one output contone object does not exceed a second predetermined number of contone objects per scan line capable of being processed by the logic.

3. The method of claim 1, further comprising:

generating from each input line work object one intermediary line work object including color data for each pixel in the input line work object, wherein the output line work object is generated from one intermediary line work object;

generating from each input contone object one intermediary contone object including color data for each pixel in the input contone object, wherein the output contone object is generated from one intermediary contone object;

determining whether there are more than a maximum number of intermediary line work objects that intersect one scan line; and merging multiple intermediary line work objects into one merged output line work object if there are more than the maximum number of intermediary line work objects intersecting the scan line, wherein one output line work object is generated for the merged intermediary line work object such that the generated output line work objects that intersect a scan line are less than the maximum number.

4. The method of claim 3, wherein merging the intermediary line work objects comprises:
- determining regions comprising one or more scan lines intersected by a set of one or more intermediary line work objects, wherein there is a separate region for each set of scan lines intersected by a unique set of intermediary line work objects; and
- determining for each region the set of intermediary line work objects that intersect the region, wherein the output line work objects are generated for each region and one merged output line work objects is generated for each region that has more than the maximum number of intermediary line work objects that intersect the region.

5. The method of claim 3, wherein each intermediary line work object has an associated priority value, wherein color data of one intermediary line work object is to be displayed over color data from intermediary line work objects having a lower associated priority, further comprising:
- selecting at least two intermediary line work objects to merge into one merged output line work object for the region, wherein there is no intermediary line work object having a priority between the priorities associated with the selected line work object.

6. The method of claim 1, wherein generating each output line work object comprises performing:
- associating a priority value with each intermediary line work and contone object has an associated priority value;
- defining at least one set of one or more input line work objects that provide pixel data for a same set of one or more scan lines;
- selecting, for each defined set of line work objects, a highest priority input line work object in one set of input line work objects; and
- generating, for each defined set of line work objects, color data for each pixel in the output line work object from non-transparent color data supplied for the pixel from the selected input line work object and setting the control data for the pixel to use the color data in the output line work object if there is no input contone object including non-transparent color data for the pixel having higher priority than the selected input line work object.

7. The method of claim 6, further comprising setting the control data for the pixel in the output line work object for the selected input line work object to use non-transparent color data in the output contone object for the pixel if the input contone object providing the non-transparent color data has a higher priority than the selected input line work object.

8. The method of claim 6, further comprising setting the control data for the pixel in the output line work object to transparent if the input line work object for the output line work object has transparent color data for the pixel and there is no input contone object with a higher priority than the selected input line work object providing non-transparent color data for the pixel, wherein a control data setting of transparent indicates that a next lower priority output line work object is considered to determine the color data for the pixel or that no color data is provided for the pixel.

9. The method of claim 1, further comprising generating a header object for each output line work object and output contone object including information identifying a location of the corresponding output line work or contone object in memory.

10. The method of claim 9, further comprising generating a linked list of pointers to the header objects corresponding to output line work and contone objects, wherein the list of pointers is ordered based on a priority associated with the input line work and contone objects used to generate the output line work and contone objects.

11. The method of claim 2, wherein the selection of transparency indicates that a pixel corresponding to a first output line work object is transparent and that a second output line work object should be used by the logic, wherein the first output line work object has a higher priority than the second output line work object.

12. The method of claim 11, wherein the control data is encoded in at least two bits, and wherein the second output line work object is a next lower priority output line work object to the first output line work object.

13. A system for generating raster objects, comprising:
- means for receiving a plurality of input contone and line work objects containing contone or line work data for at least one pixel on a sheet;
- means for generating for each input contone object at least one output contone object including color data for each pixel in the input contone object;
- means for generating for each input line work object at least one output line work object including color data for each pixel in the input line work object; and
- means for generating control data for each pixel, wherein the control data is encoded to indicate one of a selection of pixel data from the output line work object, a selection of pixel data from a highest priority output contone object and a selection of transparency, and wherein the control data is used by logic to select color data from the output line work object or output contone object for pixel data to send to an output device to render the pixel data.

14. The system of claim 13, further comprising means for generating for each input contone and line work objects one output contone and line work object for each color component of the color data, wherein the logic is implemented in hardware, wherein a first number of the generated at least one output line work object does not exceed a first predetermined number of line work objects per scan line capable of being processed by the logic, and wherein a second number of the generated at least one output contone object does not exceed a second predetermined number of contone objects per scan line capable of being processed by the logic.

15. The system of claim 13, further comprising:
- means for generating from each input line work object one intermediary line work object including color data for each pixel in the input line work object, wherein the output line work object is generated from one intermediary line work object;
- means for generating from each input contone object one intermediary contone object including color data for each pixel in the input contone object, wherein the output contone object is generated from one intermediary contone object;
- means for determining whether there are more than a maximum number of intermediary line work objects that intersect one scan line; and
- means for merging multiple intermediary line work objects into one merged output line work object if there are more than the maximum number of intermediary line work objects intersecting the scan line, wherein one output line work object is generated for the merged intermediary line work object such that the generated output line work objects that intersect a scan line are less than the maximum number.

16. The system of claim 15, wherein the means for merging the intermediary line work objects further comprises:
means for determining regions comprising one or more scan lines intersected by a set of one or more intermediary line work objects, wherein there is a separate region for each set of scan lines intersected by a unique set of intermediary line work objects; and
means for determining for each region the set of intermediary line work objects that intersect the region, wherein the output line work objects are generated for each region and one merged output line work objects is generated for each region that has more than the maximum number of intermediary line work objects that intersect the region.

17. The system of claim 15, wherein each intermediary line work object has an associated priority value, wherein color data of one intermediary line work object is to be displayed over color data from intermediary line work objects having a lower associated priority, further comprising:
means for selecting at least two intermediary line work objects to merge into one merged output line work object for the region, wherein there is no intermediary line work object having a priority between the priorities associated with the selected line work object.

18. The system of claim 13, wherein the means for generating each output line work object further comprises:
means for associating a priority value with each intermediary line work and contone object has an associated priority value;
means for defining at least one set of one or more input line work objects that provide pixel data for a same set of one or more scan lines;
means for selecting, for each defined set of line work objects, a highest priority input line work object in one set of input line work objects; and
means for generating, for each defined set of line work objects, color data for each pixel in the output line work object from non-transparent color data supplied for the pixel from the selected input line work object and setting the control data for the pixel to use the color data in the output line work object if there is no input contone object including non-transparent color data for the pixel having higher priority than the selected input line work object.

19. The system of claim 18, further comprising means for setting the control data for the pixel in the output line work object for the selected input line work object to use non-transparent color data in the output contone object for the pixel if the input contone object providing the non-transparent color data has a higher priority than the selected input line work object.

20. The system of claim 18, further comprising means for setting the control data for the pixel in the output line work object to transparent if the input line work object for the output line work object has transparent color data for the pixel and there is no input contone object with a higher priority than the selected input line work object providing non-transparent color data for the pixel, wherein a control data setting of transparent indicates that a next lower priority output line work object is considered to determine the color data for the pixel or that no color data is provided for the pixel.

21. The system of claim 13, further comprising means for generating a header object for each output line work object and output contone object including information identifying a location of the corresponding output line work or contone object in memory.

22. The system of claim 21, further comprising means for generating a linked list of pointers to the header objects corresponding to output line work and contone objects, wherein the list of pointers is ordered based on a priority associated with the input line work and contone objects used to generate the output line work and contone objects.

23. The system of claim 14, wherein the selection of transparency indicates that a pixel corresponding to a first output line work object is transparent and that a second output line work object should be used by the logic, wherein the first output line work object has a higher priority than the second output line work object.

24. The system of claim 23, wherein the control data is encoded in at least two bits, and wherein the second output line work object is a next lower priority output line work object to the first output line work object.

25. An information bearing medium for generating raster objects, wherein the information bearing medium includes code capable of causing a processor to perform:
receiving a plurality of input contone and line work objects containing contone or line work data for at least one pixel on a sheet;
generating for each input contone object at least one output contone object including color data for each pixel in the input contone object;
generating for each input line work object at least one output line work object including color data for each pixel in the input line work object; and
generating control data for each pixel, wherein the control data is encoded to indicate one of a selection of pixel data from the output line work object, a selection of pixel data from a highest priority output contone object, and a selection of transparency, and wherein the control data is used by logic to select color data from the output line work object or output contone object for pixel data to send to an output device to render the pixel data.

26. The information bearing medium of claim 25, wherein the code is further capable of causing the processor to perform generating for each input contone and line work objects one output contone and line work object for each color component of the color data, wherein the logic is implemented in hardware, wherein a first number of the generated at least one output line work object does not exceed a first predetermined number of line work objects per scan line capable of being processed by the logic, and wherein a second number of the generated at least one output contone object does not exceed a second predetermined number of contone objects per scan line capable of being processed by the logic.

27. The information bearing medium of claim 25, wherein the code is further capable of causing the processor to perform
generating from each input line work object one intermediary line work object including color data for each pixel in the input line work object, wherein the output line work object is generated from one intermediary line work object;
generating from each input contone object one intermediary contone object including color data for each pixel in the input contone object, wherein the output contone object is generated from one intermediary contone object;

determining whether there are more than a maximum number of intermediary line work objects that intersect one scan line; and merging multiple intermediary line work objects into one merged output line work object if there are more than the maximum number of intermediary line work objects intersecting the scan line, wherein one output line work object is generated for the merged intermediary line work object such that the generated output line work objects that intersect a scan line are less than the maximum number.

28. The information bearing medium of claim 25, wherein merging the intermediary line work objects comprises:

determining regions comprising one or more scan lines intersected by a set of one or more intermediary line work objects, wherein there is a separate region for each set of scan lines intersected by a unique set of intermediary line work objects; and determining for each region the set of intermediary line work objects that intersect the region, wherein the output line work objects are generated for each region and one merged output line work objects is generated for each region that has more than the maximum number of intermediary line work objects that intersect the region.

29. The information bearing medium of claim 27, wherein each intermediary line work object has an associated priority value, wherein color data of one intermediary line work object is to be displayed over color data from intermediary line work objects having a lower associated priority, wherein the code is further capable of causing the processor to perform:

selecting at least two intermediary line work objects to merge into one merged output line work object for the region, wherein there is no intermediary line work object having a priority between the priorities associated with the selected line work object.

30. The information bearing medium of claim 25, wherein the code for generating each output line work object is further capable of causing the processor to perform:

associating a priority value with each intermediary line work and contone object has an associated priority value;

defining at least one set of one or more input line work objects that provide pixel data for a same set of one or more scan lines;

selecting, for each defined set of line work objects, a highest priority input line work object in one set of input line work objects; and generating, for each defined set of line work objects, color data for each pixel in the output line work object from non-transparent color data supplied for the pixel from the selected input line work object and setting the control data for the pixel to use the color data in the output line work object if there is no input contone object including non-transparent color data for the pixel having higher priority than the selected input line work object.

31. The information bearing medium of claim 30, wherein the code is further capable of causing the processor to perform setting the control data for the pixel in the output line work object for the selected input line work object to use non-transparent color data in the output contone object for the pixel if the input contone object providing the non-transparent color data has a higher priority than the selected input line work object.

32. The information bearing medium of claim 30, wherein the code is further capable of causing the processor to perform setting the control data for the pixel in the output line work object to transparent if the input line work object for the output line work object has transparent color data for the pixel and there is no input contone object with a higher priority than the selected input line work object providing non-transparent color data for the pixel, wherein a control data setting of transparent indicates that a next lower priority output line work object is considered to determine the color data for the pixel or that no color data is provided for the pixel.

33. The information bearing medium of claim 25, wherein the code is further capable of causing the processor to perform generating a header object for each output line work object and output contone object including information identifying a location of the corresponding output line work or contone object in memory.

34. The information bearing medium of claim 25, wherein the code is further capable of causing the processor to perform generating a linked list of pointers to the header objects corresponding to output line work and contone objects, wherein the list of pointers is ordered based on a priority associated with the input line work and contone objects used to generate the output line work and contone objects.

35. The information bearing medium of claim 26, wherein the selection of transparency indicates that a pixel corresponding to a first output line work object is transparent and that a second output line work object should be used by the logic, wherein the first output line work object has a higher priority than the second output line work object.

36. The information bearing medium of claim 35, wherein the control data is encoded in at least two bits, and wherein the second output line work object is a next lower priority output line work object to the first output line work object.

37. A computer readable medium containing raster object data structures comprising:

at least one output line work object including line work color data for each pixel for which color data is provided in at least one input line work object, wherein one output line work object is generated for each input line work object; and at least one output contone object including contone color data for each pixel for which color data is provided in at least one input contone object, wherein one output line work object is generated for each input contone object; and control data for each pixel indicating whether to select data from the output line work object or output contone object for the pixel, wherein the control data is encoded to indicate one of a selection of pixel data from the output line work object, a selection of pixel data from a highest priority output contone object, and a selection of transparency, and wherein the control data is used by logic to select color data from the output line work object or output contone object for pixel data to send to an output device to render the pixel data.

38. The computer readable medium of claim 37, wherein there is one output contone and line work object generated for each input contone and line work object, respectively, for each color component of the color data, wherein the logic is implemented in hardware, and wherein a first number of the generated at least one output line work object does not exceed a first predetermined number of line work objects per scan line capable of being processed by the logic, and wherein a second number of the generated at least one output contone object does not exceed a second predetermined number of contone objects per scan line capable of being processed by the logic.

39. The computer readable medium of claim 37, further comprising:
- at least one intermediary line work object including color data for each pixel in the input line work object, wherein one intermediary line work object is generated for each input line work object, wherein the output line work object is generated from one intermediary line work object;
- at least one intermediary contone object including color data for each pixel in the input contone object and generated for each input contone object, wherein the output contone object is generated from one intermediary contone object;
- a merged output line work object formed by merging multiple intermediary line work objects if there are more than the maximum number of intermediary line work objects intersecting the scan line, wherein one output line work object is generated for the merged intermediary line work object such that the generated output line work objects that intersect a scan line are less than the maximum number.

40. The computer readable medium of claim 39, wherein each intermediary line work object has an associated priority value, wherein color data of one intermediary line work object is to be displayed over color data from intermediary line work objects having a lower associated priority, wherein there is no intermediary line work object having a priority between the priorities associated with the selected line work object.

41. The computer readable medium of claim 37, further comprising a header object for each output line work object and output contone object including information identifying a location of the corresponding output line work or contone object in memory.

42. The computer readable medium of claim 41, further comprising a linked list of pointers to the header objects corresponding to output line work and contone objects, wherein the list of pointers is ordered based on a priority associated with the input line work and contone objects used to generate the output line work and contone objects.

43. The computer readable medium of claim 38, wherein the selection of transparency indicates that a pixel corresponding to a first output line work object is transparent and that a second output line work object should be used by the logic, wherein the first output line work object has a higher priority than the second output line work object.

44. The computer readable medium of claim 43, wherein the control data is encoded in at least two bits, and wherein the second output line work object is a next lower priority output line work object to the first output line work object.

* * * * *